United States Patent Office 3,312,726
Patented Apr. 4, 1967

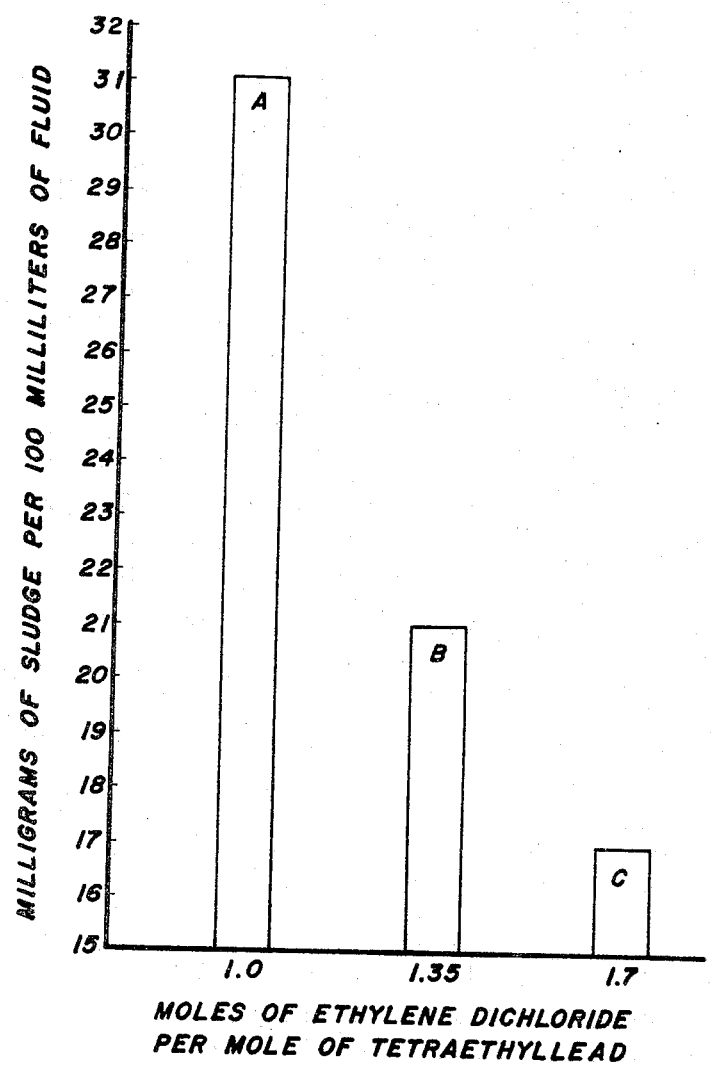

3,312,726
STABILIZED TETRAALKYLLEAD COMPOUNDS
Shirl E. Cook, Baton Rouge, La., assignor to Ethyl Corporation, New York, N.Y., a corporation of Virginia
Filed Mar. 3, 1965, Ser. No. 436,938
The portion of the term of the patent subsequent to Mar. 12, 1980, has been disclaimed
23 Claims. (Cl. 260—437)

This application is a continuation of my prior copending applications Ser. No. 264,023, filed Mar. 11, 1963, now abandoned, and Ser. No. 292,929, filed July 5, 1963, now abandoned.

This invention relates to the stabilization of concentrated alkyllead antiknock agents. This invention also relates to light stable tetraethyllead compositions. It also relates to methods for inhibiting the photochemical decomposition of tetraethyllead compositions under ambient temperature conditions or at elevated temperatures such as when subjected to temperatures in the range of about 100 to about 195° C. More particularly, this invention relates to and has as its principal object the provision of novel antiknock fluid compositions of enhanced storage and thermal stability.

The principal tetraethyllead fluids currently marketed contain both ethylene dichloride and ethylene dibromide which, in addition to being scavengers for the lead compounds also provide thermal and light stability to the tetraethyllead fluids during operation and during storage and use of these materials. However, the ethylene dibromide previously used is very costly and it is therefore desirable to eliminate this component from antiknock fluids. However, the resulting fluid is too unstable when subjected to light to be used and marketed commercially. The commercial product is exposed to light during normal handling and as a result forms heavy sludges when it is not stabilized. This sludging problem is particularly undesirable in storage and transportation where such sludge tends to build up during long periods of use, resulting in the continual contamination of fresh tetraethyllead fluids and requiring periodic and frequent cleaning of storage and transport equipment. Because of the extreme toxicity of organo lead compounds, this cleaning and maintenance is very undesirable and is to be avoided if at all possible.

It is to be seen therefore that in operations wherein the tetraethyllead antiknock is used in substantially undiluted or concentrated state (before being added to gasoline) such as during purification, blending, transportation and fluid storage, the likelihood of excessive light catalyzed decomposition must be provided for and effectively prevented.

Alkyllead antiknock compounds must also be adequately protected against thermal decomposition during storage and shipment. Otherwise upon reaching sufficiently high temperatures, the alkyllead compounds will undergo rapid thermal decomposition with the evolution of large quantities of gas, which may lead to violent explosions.

Fused ring aromatic hydrocarbons, such as naphthalene, are known thermal stabilizers for alkyllead compounds (U.S. 2,660,591–2,660,596, inclusive). It has also been found that mixtures of fused ring aromatic hydrocarbons are substantially more effective as alkyllead thermal stabilizers than such individual compounds as naphthalene and the like (U.S. 3,038,916).

As is well known in the art, it is important to provide thermally stabilized alkyllead antiknock fluid compositions which are characterized by good resistance against oxidative decomposition during such operations as storage and shipment. Failure to observe this criterion will result in the provision of antiknock fluids which will tend to form sludge and other decomposition products resulting from interaction between the components of the antiknock fluid composition and air. The resulting sludges are troublesome in that they tend to clog fuel lines, pumps, injection devices, and the like, and to form undesirable deposits in engine induction systems. Also, oxidative decomposition of the tetraalkyllead compounds results in loss of antiknock effectiveness, the primary purpose for which such compounds are used.

An object of this invention is to stabilize tetraethyllead compositions against light catalyzed decomposition and to provide compositions which can be satisfactorily handled, transported and stored. Another object is to provide novel antiknock fluids of enhanced storage and thermal stability.

The above and other objects of this invention are accomplished in one embodiment by incorporating in tetraethyllead a relatively small quantity of certain compositions having the property of effectively inhibiting light catalyzed decomposition in tetraethyllead concentrates.

The light stabilized tetraethyllead compositions of this invention comprise tetraethyllead and a synergistic light stabilizer mixture consisting essentially of (1) from 0.25 to 1.5 moles of ethylene dichloride per mole of tetraethyllead and (2) from 1 percent to 30 percent by weight of a fused ring aromatic hydrocarbon, based upon the weight of the tetraethyllead. Most preferred compositions of this invention contain from about 5 percent to about 20 percent of the fused ring aromatic hydrocarbon based upon the weight of the tetraethyllead in the stabilized composition.

In the practice of this embodiment of the invention propylene dichloride can be effectively used as a total or partial replacement for the ethylene dichloride.

It has now been discovered in accordance with another embodiment that ethylene dichloride when utilized in combination with fused ring aromatic hydrocarbon thermal stabilizers confers excellent stability against oxidative deterioration upon alkyllead antiknock agents provided a particular minimum concentration of the ethylene dichloride is so employed. These and other beneficial results of this embodiment of the invention are accomplished by using from about 1.3 to about 2.5 moles, and preferably from about 1.6 to about 2.0 moles, of ethylene dichloride per mole of alkyllead antiknock agent contained in the antiknock fluid composition. Accordingly, an embodiment of this invention is a concentrated antiknock fluid composition consisting essentially of an alkyllead antiknock agent; from about 1 to about 25 weight percent, based on the weight of the alkyllead antiknock agent, of a fused ring aromatic hydrocarbon; and from about 1.3 to about 2.5 moles, and preferably from about 1.6 to about 2.0 moles, of ethylene dichloride per mole of said alkyllead antiknock agent.

In the practice of this embodiment of the invention the use of mixtures of fused ring aromatic hydrocarbons, such as those described in U.S. 3,038,916 (all disclosures of which are incorporated herein by the foregoing reference), is preferred as such mixtures are more effective as thermal stabilizers than individual fused ring aromatic hydrocarbons, and such mixtures are cheaper and possess better physical properties rendering them ideally suited for this use. For example, a wide variety of mixtures of fused ring aromatic hydrocarbons which are readily available as low cost articles of commerce are characterized by being liquid at ordinary temperatures. Particularly preferred thermal stabilizer ingredients for use in the practice of this invention are mixtures of fused ring aromatic hydrocarbons which include methyl naphthalenes as these mixtures are highly compatible with alkyllead antiknock agents and have been found to exert considerable effectiveness as thermal stabilizers therefor.

As noted above, the thermal stabilizer ingredient of the antiknock fluid compositions of the present embodiment is present in amount ranging from about 1 to about 25 weight percent, based on the weight of the alkyllead antiknock agent contained in the concentrate. From the cost effectiveness standpoint this amount preferably ranges from about 2 to about 20 percent by weight, with concentrations ranging from about 5 to about 15 weight percent being most particularly preferred for most conditions generally encountered during shipment and storage operations. Fused ring aromatic hydrocarbons containing up to about 20 carbon atoms in the molecule, particularly mixtures which are liquid at room temperature, are particularly suitable as such mixtures can be readily dissolved with the alkyllead antiknock agents in the foregoing concentrations without the necessity of excessive agitation or related blending steps.

The concentration of ethylene dichloride utilized in the compositions of the present embodiment is of considerable importance. It has been found for example that if the concentration of ethylene dichloride is significantly less than about 1.3 moles per mole of alkyllead compound, an unduly excessive amount of insoluble sludge will be formed even though the initial antiknock fluid composition contains substantial amounts of the fused ring aromatic hydrocarbon materials which are noted for their solvency properties. Moreover, this sludge is formed relatively rapidly. The data presented graphically in the figure of the drawing serve as an illustration of the importance of having present at least about 1.3 moles of ethylene dichloride per mole of alkyllead compound. These data were obtained by subjecting several tetraethyllead antiknock fluid compositions to a standard accelerated storage stability test and determining in each instance the amount of insoluble sludge which had formed during the test. In these tests three antiknock fluid compositions were utilized as follows:

| | Composition | |
|---|---|---|
| | EDC Concentration, moles/mole TEL [1] | Concentration of Fused Ring Aromatic Hydrocarbon Mixture,[2] Wt. Percent Based on TEL |
| Mix A | 1.0 | 17.9 |
| Mix B | 1.35 | 11.3 |
| Mix C | 1.7 | 4.7 |

[1] Ethylene dichloride.
[2] A commercially available hydrocarbon mixture containing a significant quantity of dimethyl naphthalene isomers as well as some higher polynuclear aromatic compounds. Distillation temperature profile: Initial, 254° C.; 10 percent, 267° C.; 50 percent, 282° C.; 90 percent, 307° C.; final, 323° C.

The standard test procedure to which Mixes A, B and C were subjected involved placing the mixes in glass bottles containing 80 percent outage (i.e., each bottle contained 80 percent by volume of air). These samples were then stored at 50° C. for a period of 168 hours. Thereupon the mixes were subjected to standard analytical and inspection procedures in order to determine the extent to which oxidation deterioration had occurred.

Referring more particularly to the figure, Bar A, which represents the results achieved by utilizing Mix A, shows that during the above tests an excessive amount of insoluble sludge (i.e., 31 milligrams per 100 milliliters of antiknock fluid) was formed. On the other hand, when the concentration of ethylene dichloride was raised to about 1.3 moles per mole of tetraethyllead (Mix B), the amount of sludge was sharply reduced; only 21 milligrams per 100 milliliters of antiknock fluid was formed. In the case of Mix C, where the ethylene dichloride concentration was 1.7 moles per mole of tetraethyllead, the amount of insoluble sludge was still further reduced to but 17 milligrams per 100 milliliters of antiknock fluid. It is interesting to note that the amount of aromatic hydrocarbons utilized in Mixes B and C was lower than used in Mix A. Such hydrocarbons are often sold and used as solvents and yet the relatively high concentration used in Mix A did not keep the sludge from precipitating to an excessive extent.

It will also be observed from the above data that as the concentration of ethylene dichloride is increased beyond about 1.3 the total amount of insoluble sludge becomes progressively less.

So far as is known neither ethylene dichloride nor fused ring aromatic hydrocarbons have heretofore been known or reported to process any antioxidant effectiveness, muchless effectiveness in stabilizing concentrated tetraethyllead antiknock compounds against premature oxidative deterioration.

In stability against oxidative deterioration the antiknock fluid compositions provided by this invention have been found by tests similar to those reported above to be comparable, if not superior, to the largest volume antiknock fluid composition in commercial use today, i.e., compositions containing about 1.0 mole of ethylene dichloride and about 0.5 mole of ethylene dibromide per mole of contained tetraethyllead. For example, Mix C was found to contain 0.16 gram of soluble lead salts per 100 milliliters of tetraethyllead when subjected to the above standard test procedure whereas under the same conditions the value for the commercial antiknock fluid was 0.20 gram per 100 milliliters. Such findings are particularly significant because the essential ingredients in the compositions of this invention are significantly less expensive than the essential ingredients used in the commercially used antiknock fluid compositions. Moreover, insofar as thermal stability is concerned, the present antiknock fluid compositions possess a distinct advantage over the foregoing commercially used antiknock fluid, this being in terms of their respective rates of thermal decomposition when subjected to highly elevated temperatures in the range of about 190–220° C. where the initiation of rapid adiabatic decomposition of such fluids begins. By way of example, a currently used commercial antiknock composition [tetraethyllead plus 1.0 theory of ethylene dichloride and 0.5 theory of ethylene dibromide—a theory being equivalent to a mole per mole of tetraethyllead] when heated to about 220° C. was found to build up pressure through adiabatic decomposition at the rate of 62,500 p.s.i. per second. In sharp contrast, various compositions of this invention were found to build up pressure under comparable conditions at rates which were only a small fraction of this value. The results of these comparative tests are more fully described in the following table.

RATES OF ADIABATIC DECOMPOSITION OF ANTIKNOCK FLUIDS

| | Composition | Initiation Temperature, ° C. | Rate of Pressure Rise, p.s.i./second |
|---|---|---|---|
| 1 | Commercial Fluid | 220 | 62,500 |
| 2 | Mix D [1] | 192 | 2,400 |
| 3 | Mix E [2] | 200 | 1,900 |

[1] Composed of 1.7 moles of ethylene dichloride per mole of tetraethyllead plus 5 percent by weight (based on the tetraethyllead) of a commercially available mixture of fused ring aromatic hydrocarbons having an initial boiling point of about 232° C., a 50 percent boiling point of about 247° C. and a final boiling point of about 279° C., the mixture containing, inter alia, significant quantities of 2-methyl naphthalene and various dimethyl naphthalenes, principally 1,3-dimethyl naphthalene, 1,4-dimethyl naphthalene and 1,6-dimethyl naphthalene.
[2] Composed of 1.7 moles of ethylene dichloride per mole of tetraethyllead plus 8.5 percent by weight (based on the tetraethyllead) of a commercially available mixture of fused ring aromatic hydrocarbons having an initial boiling point of about 250° C., a 50 percent boiling point of about 280° C. and a final boiling point of about 325° C., the mixture containing, inter alia, dimethyl naphthalene isomers and some highly polynuclear aromatic compounds.

Illustrative examples of other compositions of this invention are presented below. In these examples the percentages of the various fused ring aromatic hydrocarbons are weight percentages based upon the weight of the alkyllead antiknock compound employed. By the same token, the moles of ethylene dichloride (or other equivalent chlorohydrocarbon compound) are based upon each mole of alkyllead compound present in the composition.

EXAMPLE I
Tetraethyllead
2 percent naphthalene
2 moles ethylene dichloride

EXAMPLE II
Tetraethyllead
1 percent anthracene
2.5 moles of ethylene dichloride

EXAMPLE III
Tetraethyllead
25 percent hydrocarbon mixture refluxing at 255±5° C. at 50 mm. mercury pressure, having a maximum viscosity of 500 SSU at 75° F. and of 100 SSU at 212° F. and containing fused ring aromatic hydrocarbons including naphthalene, alkyl naphthalenes, and 1,2,3,4-tetrahydronaphthalene
1.3 moles of ethylene dichloride

EXAMPLE IV
Tetraethyllead
5 percent of 1-methyl naphthalene
1.3 moles of ethylene dichloride plus 0.3 mole of propylene dichloride

EXAMPLE V
Tetraethyllead
15 percent of a commercially available mixture of different fused ring aromatic hydrocarbons containing mono- and dialkyl naphthalenes including ethyl naphthalenes and dimethyl naphthalenes with the methyl-substituted naphthalenes predominating
1.0 mole of ethylene dichloride plus 1.0 mole of 1,1-dichloroethane

EXAMPLE VI
Tetraethyllead
20 percent of an equimolar mixture of 1,2,3,4-tetrahydronaphthalene, 2-ethyl naphthalene, 1,4-dimethyl naphthalene, and 2-methyl naphthalene
1.6 moles ethylene dichloride

EXAMPLE VII
Tetrapropyllead
1 percent of anthracene plus 2 percent of 1-methyl naphthalene plus 2 percent of 1,2,3,4-tetrahydronaphthalene
1.5 moles ethylene dichloride

EXAMPLE VIII
Tetramethyllead
10 percent of a mixture of fused ring aromatic hydrocarbons including dimethyl naphthalene isomers
1.8 moles of propylene dichloride

EXAMPLE IX
Equimolar mixture of tetramethyllead and tetraethyllead
0.5 percent of 9-ethyl-9,10-dihydroanthracene plus 2.5 percent of 2-methyl naphthalene
2.4 moles of ethylene dichloride

EXAMPLE X
A mixture of alkylleads composed of 5.7 weight percent tetramethyllead, 23.8 weight percent ethyltrimethyllead, 37.4 percent diethyldimethyllead, 26.2 weight percent triethylmethyllead, and 6.9 weight percent of tetraethyllead
12 percent of a mixture containing, inter alia, 1-methyl naphthalene, 2-methyl naphthalene, 1,3-dimethyl naphthalene, 1,4-dimethyl naphthalene, 1,5-dimethyl naphthalene, and 1,6-dimethyl naphthalene
1.2 moles of ethylene dichloride plus 0.2 mole of propylene dichloride plus 0.2 mole of 1,1-dichloroethane Other compositions of the present invention will now be readily apparent to those skilled in the art.

As brought out by the examples presented above, the principles of this invention may be successfully applied to the stabilization of various alkyllead antiknock compounds whether singly or in admixture. Exemplary of such alkyllead antiknocks are tetramethyllead, ethyltrimethyllead, diethyldimethyllead, triethylmethyllead, tetraethyllead, ethyltripropyllead, methyldiethylpropyllead, tetrapropyllead, tetrabutyllead, phenyltriethyllead, tetraamyllead, tetrahexyllead, tetraoctyllead, and the like. Examples of suitable mixtures of alkyllead compounds include 10 mole percent tetramethyllead, 90 mole percent tetraethyllead; 25 mole percent tetramethyllead, 75 mole percent tetraethyllead; 50 mole percent tetramethyllead, 50 mole percent tetraethyllead; 75 mole percent tetramethyllead, 25 mole percent tetraethyllead; 90 mole percent tetramethyllead, 10 mole percent tetraethyllead; 20 mole percent tetramethyllead, 20 mole percent diethyldimethyllead, 60 mole percent tetraethyllead; 0.4 weight percent tetramethyllead, 4.3 weight percent ethyltrimethyllead, 20.2 weight percent diethyldimethyllead, 42.1 weight percent triethylmethyllead, 33.0 weight percent tetraethyllead; 5.7 weight percent tetramethyllead, 23.8 weight percent ethyltrimethyllead, 37.4 weight percent diethyldimethyllead, 26.2 weight percent triethylmethyllead, 6.9 weight percent tetraethyllead; 30.0 weight percent tetramethyllead, 42.1 weight percent ethyltrimethyllead, 22.2 weight percent diethyldimethyllead, 5.2 weight percent triethylmethyllead, 0.5 weight percent tetraethyllead.

From a cost effectiveness standpoint, the use of tetramethyllead, ethyltrimethyllead, diethyldimethyllead, triethylmethyllead, tetraethyllead, and mixtures of 2, 3, 4 or 5 of these materials are preferred.

Suitable fused ring aromatic hydrocarbons for use in this invention include naphthalene, 1-methyl naphthalene, 2-methyl naphthalene, 1-ethyl naphthalene, 2-ethyl naphthalene, 1-propyl naphthalene, 2-propyl naphthalene, 1-butyl naphthalene, 2-butyl naphthalene, 1,2-dimethyl naphthalene, 1,3-dimethyl naphthalene, 1,4-dimethyl naphthalene, 1,5-dimethyl naphthalene, 1,6-dimethyl naphthalene, 1,7-dimethyl naphthalene, 1,8-dimethyl naphthalene, 2,3-dimethyl naphthalene, 2,4-dimethyl naphthalene, 2,7-dimethyl naphthalene, the various diethyl naphthalenes, anthracene, the alkyl substituted anthracenes, the partially hydrogenated naphthalenes and anthracenes, chrysene, indene, acenaphthene, phenanthrene, 9,10-dimethyl phenanthrene, benzyl naphthalene, fluorene, pyrene, phenyl naphthalene, the isopropyl naphthalenes, and the like. Mixtures of different fused ring aromatic hydrocarbons including or similar to those just described, especially mixtures which contain alkylated naphthalenes, notably methyl and dimethyl naphthalenes, are preferred because of their excellent solubility characteristics, high availability and relatively low costs. As noted above, it is desirable to utilize mixtures of different fused ring aromatic hydrocarbons which are liquid at ambient temperatures as this greatly facilitates blending operations and also decreases the likelihood of phase separation of the resultant alkyllead antiknock composition at low temperatures such as encountered in winter storage. In those instances where the fused ring aromatic hydrocarbons or mixtures thereof used pursuant to this invention are normally solid or are liquids with relatively high freezing points, it is helpful to admix the same with other hydrocarbons such as aliphatic, cycloaliphatic or lower boiling aromatic hydrocarbons. Generally speaking, binuclear fused ring aromatic hydrocarbons or mixtures thereof which contain less than about 5 percent of tri and/or higher polynuclear components are preferable to the higher molecular weight fused ring aromatic hydrocarbons from the solubility and freezing point standpoints. It is also preferable to employ ring aromatic hydrocarbons whose boiling points at or extrapolated to atmospheric pressure do not exceed about 350° C.

Propylene dichloride or 1,1-dichloroethane, or both, may be used in addition to or in lieu of the ethylene dichloride in formulating the present compositions. Propylene dichloride is a homolog and 1,1-dichloroethane is an isomer of ethylene dichloride and for the purposes of the present invention are entirely equivalent thereto.

Another material which can be and is preferably used in the present compositions is an appropriate oil soluble dye. The nature of these materials is well known to those skilled in the art and needs no amplification here. These organic materials are used in the art for identification purposes and are utilized in relatively small concentrations, e.g., about 0.01 to about 0.1 weight percent, based on the total composition.

of 2-methyl naphthalene and various dimethyl naphthalenes principally 1,3-dimethyl naphthalene, 1,4-dimethyl naphthalene and 1,6-dimethyl naphthalene.

A 10 ml. sample of each of these tetraethyllead compositions was placed in a glass translucent vessel and placed at a distance of six inches from a fluorescent source of light. The fluorescent light was Westinghouse Cool White type of 30 watt capacity. The above test procedure is a standard light-sensitivity test designed to provide accelerated light catalyzed decomposition data. The test conditions employed provide decomposition data in a few hours which normally requires several days or longer under normal storage or transportation conditions. The following table lists the results obtained from these tests.

|  | I | II | III | IV |
|---|---|---|---|---|
| Ethylene Dichloride |  | 0.5 mole |  | 0.5 mole. |
| Hydrocarbon |  |  | 15% | 15%. |
| 1 Hr. UV Exposure | Opaque | Cloudy | Clear | Clear. |
| 2½ Hr. UV Exposure | Heavy p.p.t | Heavy p.p.t | Light Floc | Clear.* |
| 4 Hr. UV Exposure | Very Heavy p.p.t | Heavy p.p.t | Light p.p.t | Clear.* |

*Slight grey color.

Phenolic inhibitors may likewise be utilized in the compositions of this invention as these will still further enhance the resistance of the composition to oxidative deterioration. These phenolic inhibitors are generally sterically hindered phenols, preferably mono-nuclear monohydric phenols exemplified by 2,6-di-tert-butyl phenol; 2,4,6 - tri-tert-butyl phenol; 4 - methyl-2,6-di-tert-butyl phenol; 2,4-di-methyl-6-tert-butyl phenol; a mixture of o-tert-butyl phenol, 2,6-di-tert-butyl phenol, and 2,4,6-tri-tert-butyl phenol; and the like. Such materials may be used at concentrations ranging from about 0.02 to about 0.2 weight percent, based on the total composition.

In addition to the fused ring aromatics, various other well known alkyllead thermal stabilizer materials can be effectively used in conjunction with the several ingredients employed in formulating the novel antiknock fluid compositions of this invention. Such thermal stabilizers include those described in U.S. 2,660,591–2,660,596, inclusive; in U.S. 2,992,250–2,992,261, inclusive; and in U.S. 3,004,997–3,004,999, inclusive. Especially suitable materials of this type, several of which serve additional functions, include hexachloropropylene, 2-ethyl-1,3-hexane diol, ethylene dibromide, furfural, 2-methyl-2,4-pentane diol, resorcinol, and similar materials.

To illustrate the effectiveness of this invention in protecting tetraethyllead against light catalyzed decomposition a series of direct comparisons were made of the light catalyzed decomposition of tetraethyllead mixtures. This series of tests was conducted using (1) Pure tetraethyllead, without any additives
(2) Tetraethyllead containing 0.5 mole of ethylene dichloride per mole of tetraethyllead
(3) Tetraethyllead containing 15 weight percent based on the tetraethyllead of a fused ring aromatic hydrocarbon mixture
(4) Tetraethyllead containing both the fused ring aromatic hydrocarbon and 0.5 mole of ethylene dichloride per mole of tetraethyllead.

The fused ring aromatic hydrocarbon used in compositions (3) and (4) above has the following distillation temperature profile:

Distillation: Degree C.
  Initial _____ 232
  10% _____ 241
  50% _____ 247
  90% _____ 260
  Final _____ 279

The instrumental chemical analysis showed this hydrocarbon mixture to contain, inter alia, significant quantities It will be noted that the composition of this invention exhibits a remarkable degree of synergistic effectiveness.

The above-described beneficial behavior of the light stabilizer mixtures of this invention also takes place with other tetraethyllead compositions having other stabilizer systems described herein.

Other examples of the practice of this invention are given below.

EXAMPLE XI

Admixed in a blending tank are tetraethyllead, 0.7 mole of ethylene dichloride and 1,4-dibutyl naphthalene. The 1,4-dibutyl naphthalene is used in amount equivalent to 3 parts by weight per each 100 parts by weight of the tetraethyllead compounds.

EXAMPLE XII

Blended with tetraethyllead are 1-methyl naphthalene (30 parts by weight per each 100 parts by weight of the tetraethyllead mixture) and a mixture composed of 80 percent of ethylene dichloride and 20 mole percent of propylene dichloride in amount such that there are 1.2 moles of this last-named mixture per mole of the tetraethyllead.

EXAMPLE XIII

Placed in a vessel are 1 mole of tetraethyllead, an approximately equimolar mixture of methyl and dimethyl naphthalenes, and ethylene dichloride. The amounts of the stabilizer materials are such that per each 100 parts by weight of the tetraethyllead there are 2 parts by weight of the mixed methyl naphthalenes, the amount of ethylene dichloride being such that there is ½-mole thereof per mole of the tetraethyllead.

EXAMPLE XIV

Placed in a vessel is a mixture, by weight, of 600 parts of tetraethyllead, 6 parts of 1-methyl naphthalene (B.P. ca. 245° C.) and 1.0 mole of ethylene dichloride.

EXAMPLE XV

Blended with a mixture composed of tetraethyllead and 0.8 mole of ethylene dichloride is 2-ethyl naphthalene. The hydrocarbon component is used in amount equivalent to 5 parts by weight per each 100 parts by weight of the tetraethyllead.

The fused ring aromatic hydrocarbons used in the practice of the various light stablizing embodiments of this inevention include such compounds as naphthalene, the various methyl naphthalene isomers, the various dimethyl naphthalene isomers, the various ethyl naphthalene isomers, the various propyl and isopropyl naphthalene isomers, the butyl naphthalenes, the pentyl naphthalenes, the hexyl naphthalenes, the heptyl naphthalenes, the octyl naphthalenes, the dipropyl and dibutyl naphthalenes, anthracenes and the lower alkyl derivatives thereof, 1,2,3,4-tetrahydronaphthalene, and the like. The hydrocarbons preferred for use in the tetraethyllead compositions of this invention are those containing from 10 to 18 carbon atoms in the molecule and those having a boiling point at atmospheric pressure of at least about 180° C.

Commerically available mixtures of the fused ring hydrocarbons are particularly useful. When mixtures of hydrocarbons are employed it is preferred to have the hydrocarbons differ in carbon content by at least one carbon atom. Also, especially desirable results are obtained with mixtures in which each hydrocarbon is present in a concentration of at least 5 percent by weight of the other.

Most preferably the above light stablizer combinations are employed to stabilize the tetraethyllead compounds, both in storage and in shipping and especially to stabilize any tetraethyllead concentrates, i.e. compositions containing at least 80 percent by weight of the tetraethyllead compound. In this way most of the hazards involved in the event of accidental exposure to actinic light rays will economically and satisfactorily be eliminated. Furthermore, waste of the valuable tetraethyllead product due to decomposition is considerably minimized through the use of this invention.

As stated above, the compositions of this embodiment of the invention consist essentially of tetraethyllead stabilized against light-decomposition by the addition of at least one fused ring aromatic hydrocarbon and ethylene dichloride. The compositions are essentially free of ethylene dibromide, i.e. no ethylene dibromide is intentionally added to the composition. Of course, trace amounts can be present in the compositions without departing from the invention inasmuch as they may be trace impurities in the ethylene dichloride or other components of the present compositions. Moreover, the fluid compositions of this embodiment of the invention can also contain the usual other additives used in fluids and gasolines such as dyes for identification purposes, blending aids, antioxidants such as 2,6,-di-tert-butyl-phenol, 2,4,6-tri-tert-butyl phenol, 4-methyl-2,6-di-tert-butyl phenol and the like.

What is claimed is:

1. A conecentrated antiknock fluid composition consisting essentially of an alkyllead antiknock agent; from about 1 to about 25 weight percent, based on the weight of the alkyllead antiknock agent, of a fused ring aromatic hydrocarbon; and from about 1.3 to about 2.5 moles of ethylene dichloride per mole of said alkyllead antiknock agent.

2. A concentrated antiknock fluid composition consisting essentially of an alkyllead antiknock agent; from about 1 to about 25 weight perecent, based on the weight of the alkyllead antiknock agent, of a mixture of fused ring aromatic hydrocarbons; and from about 1.3 to about 2.5 moles of ethylene dichloride per mole of said alkyllead antiknock agent.

3. The composition of claim 2 further characterized in that said mixture of fused ring aromatic hydrocarbons includes methyl naphthalenes.

4. A concentrated antiknock fluid composition consisting essentially of an alkyllead antiknock agent; from about 2 to about 20 weight percent, based on the weight of the alkyllead antiknock agent, of a fused ring aromatic hydrocarbon; and from about 1.3 to about 2.5 moles of ethylene dichloride per mole of said alkyllead antiknock agent.

5. A concentrated antiknock fluid composition consisting essentially of an alkyllead antiknock agent; from about 2 to about 20 weight percent, based on the weight of the alkyllead antiknock agent, of a mixture of fused ring aromatic hydrocarbons; and from about 1.3 to about 2.5 moles of ethylene dichloride per mole of said alkyllead antiknock agent.

6. A concentrated antiknock fluid composition consisting essentially of an alkyllead antiknock agent; from about 5 to about 15 weight percent, based on the weight of the alkyllead antiknock agent, of a fused ring aromatic hydrocarbon; and from about 1.3 to about 2.5 moles of ethylene dichloride per mole of said alkyllead antiknock agent.

7. A concentrated antiknock fluid composition consisting essentially of an alkyllead antiknock agent; from about 5 to about 15 weight percent, based on the weight of the alkyllead antiknock agent, of a mixture of fused ring aromatic hydrocarbons; and from about 1.3 to about 2.5 moles of ethylene dichloride per mole of said alkyllead antiknock agent.

8. A concentrated antiknock fluid composition consisting essentially of an alkyllead antiknock agent; from about 1 to about 25 weight percent, based on the weight of the alkyllead antiknock agent, of a fused ring aromatic hydrocarbon; and from about 1.6 to about 2.0 moles of ethylene dichloride per mole of said alkyllead antiknock agent.

9. A concentrated antiknock fluid composition consisting essentially of an alkyllead antiknock agent; from about 1 to about 25 weight percent, based on the weight of the alkyllead antiknock agent, of a mixture of fused ring aromatic hydrocarbons; and from about 1.6 to about 2.0 moles of ethylene dichloride per mole of said alkyllead antiknock agent.

10. The composition of claim 9 further characterized in that said mixture of fused ring aromatic hydrocarbons includes methyl naphthalenes.

11. The composition of claim 8 further characterized in that the concentration of said fused ring aromatic hydrocarbon is from about 2 to about 20 weight percent, based on the weight of the alkyllead antiknock agent.

12. The composition of claim 9 further characterized in that the concentration of said fused ring aromatic hydrocarbon is from about 2 to about 20 weight percent, based on the weight of the alkyllead antiknock agent.

13. The composition of claim 8 further characterized in that the concentration of said fused ring aromatic hydrocarbon is from about 5 to about 15 weight percent, based on the weight of the alkyllead antiknock agent.

14. The composition of claim 9 further characterized in that the concentration of said fused ring aromatic hydrocarbon is from about 5 to about 15 weight percent, based on the weight of the alkyllead antiknock agent.

15. A concentrated antiknock fluid composition consisting essentially of an alkyllead antiknock agent selected from the group consisting of tetramethyllead, trimethylethyllead, dimethyldiethyllead, methyltriethyllead, tetraethyllead, and mixtures thereof; from about 5 to about 15 weight percent, based on the weight of the alkyllead antiknock agent, of a mixture of fused ring aromatic hydrocarbons; and from about 1.6 to about 2.0 moles of ethylene dichloride per mole of said alkyllead antiknock agent.

16. The composition of claim 15 further characterized in that said alkyllead antiknock agent is tetraethyllead and in that said mixture of fused ring aromatic hydrocarbons includes methyl naphthalenes.

17. A concentrated antiknock fluid composition consisting essentially of tetraethyllead; from about 5 to about 15 weight percent, based on the weight of the tetraethyllead, of a mixture of fused ring aromatic hydrocarbons; and about 1.35 moles of ethylene dichloride per mole of tetraethyllead.

18. A concentrated antiknock fluid composition consisting essentially of tetraethyllead; from about 5 to about 15 weight percent, based on the weight of the tetraethyllead, of a mixture of fused ring aromatic hydrocarbons; and about 1.7 moles of ethylene dichloride per mole of tetraethyllead.

19. A light stabilized tetraethyllead fluid composition consisting essentially of tetraethyllead and a synergistic light stabilizer mixture of from about 0.25 to about 1.5 moles of ethylene dichloride per mole of tetraethyllead and from about 1 percent to about 30 percent by weight of a fused ring aromatic hydrocarbon based upon the weight of the tetraethyllead.

20. The composition of claim 19 wherein the hydrocarbon is present in a concentration of about 5 percent to about 20 percent based upon the weight of the tetraethyllead in the composition.

21. The composition of claim 19 wherein the fused ring aromatic compounds contain from 10 to 18 carbon atoms in the molecule and have a boiling point at atmospheric pressure of at least 180° C.

22. The composition of claim 19 wherein the fused ring aromatic hydrocarbon is a mixture of at least two hydrocarbons having from 10 to 18 carbon atoms in the molecule and having a boiling point at atmospheric pressure of at least 180° C.

23. The composition of claim 19 wherein the fused ring aromatic hydrocarbon is a mixture of methyl naphthalenes and dimethyl naphthalenes.

References Cited by the Examiner

UNITED STATES PATENTS

| | | | |
|---|---|---|---|
| 3,038,916 | 6/1962 | Cook et al. | 260—437 |
| 3,081,326 | 3/1963 | Cook | 260—437 |
| 3,083,086 | 3/1963 | Case et al. | 252—386 |

TOBIAS E. LEVOW, *Primary Examiner.*

H. M. S. SNEED, *Assistant Examiner.*